June 29, 1971    J. DOLEMAN ET AL    3,590,109
CONTINUOUS MOLDING OF THERMOPLASTIC MATERIALS
Original Filed July 3, 1967    8 Sheets-Sheet 6
FIG. 15.
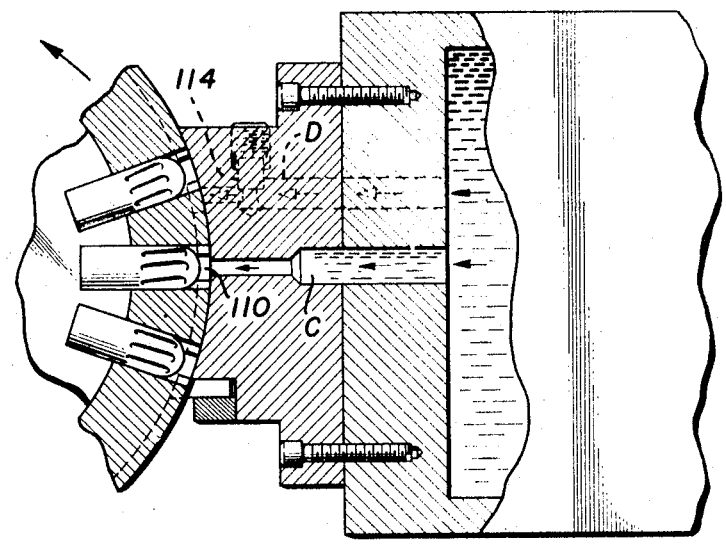
FIG. 16.
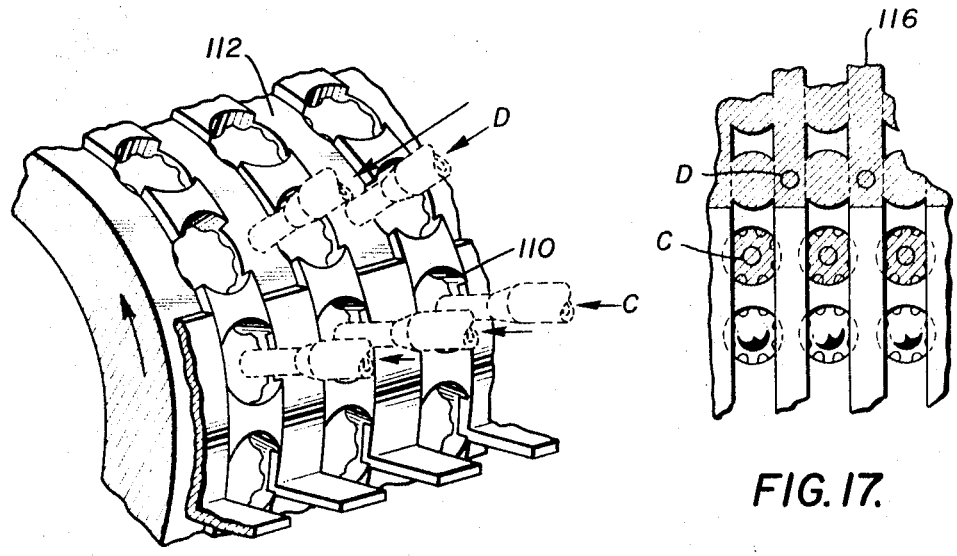
FIG. 17.
INVENTORS
WILLIAM H. HILLS
JACK DOLEMAN
ATTORNEY

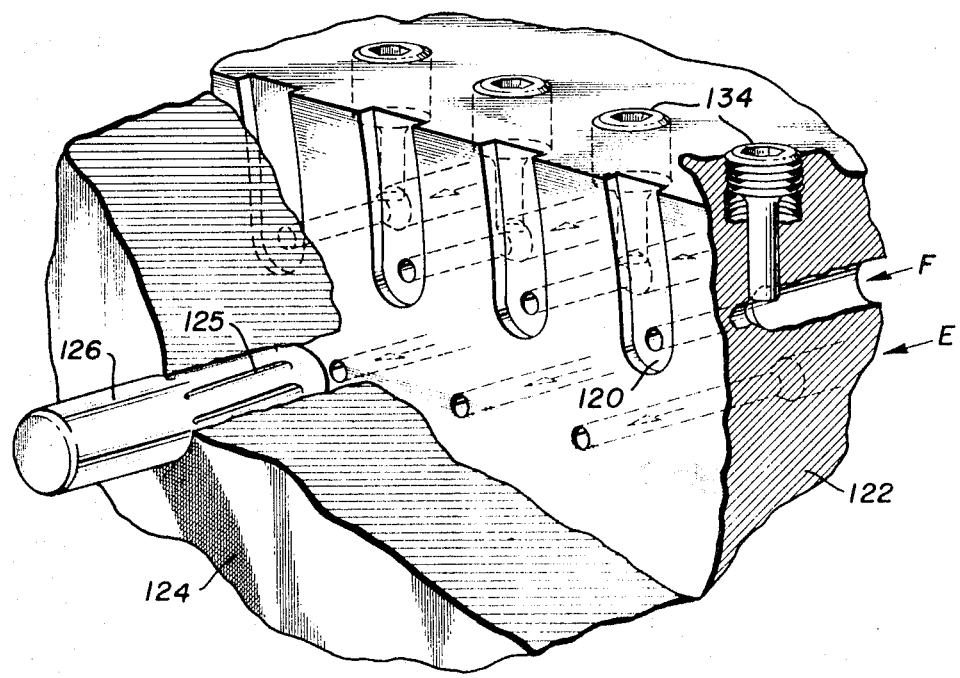
FIG. 18.
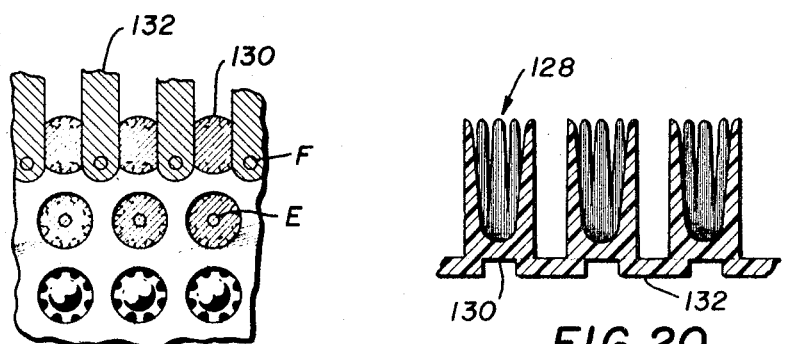
FIG. 19.
FIG. 20.

United States Patent Office 3,590,109
Patented June 29, 1971

3,590,109
CONTINUOUS MOLDING OF THERMOPLASTIC MATERIALS
Jack Doleman, Gulf Breeze, Fla., and William H. Hills, Durham, N.C., assignors to Monsanto Company, St. Louis, Mo.
Original application July 3, 1967, Ser. No. 650,986, now Patent No. 3,507,010, dated Apr. 21, 1970. Divided and this application Sept. 12, 1969, Ser. No. 857,462
Int. Cl. B29f 1/06
U.S. Cl. 264—167
18 Claims

ABSTRACT OF THE DISCLOSURE

Three-dimensional molded products are made from thermoplastic materials in a continuous injection molding process wherein a mold surface having deep cavities therein is advanced with respect to a stationary extruder mated against the mold surface so that communication exists between the cavities and the extruder causing a flowable thermoplastic material to be forced into said cavities under high pressure by isolating the cavities from the remainder of the mold. On the mold surface a continuous matrix is formed having projections attached thereto and extending into the cavities of the mold. The matrix is formed under a lower pressure than the projections. After cooling, the product is stripped from the mold.

---

This application is a division of Ser. No. 650,986, filed July 3, 1967 now U.S. Pat. 3,507,010.

BACKGROUND OF THE INVENTION

The continuous production of molded articles in essentially flat sheet is well known in the prior art. Examples of such articles include flat mats, webs, nets and the like, which are generally regarded as being two-dimensional since the ratio of thickness to width is very small. The production of these essentially two-dimensional articles can be accomplished in a continuous operation by apparatus such as that disclosed in French Pat. No. 1,246,923. In these molding processes however, the shaping of the plastic material occurs between opposed rolls which are generally patterned or engraved only slightly to impart not more than a slight three-dimensional effect. While these processes appear to be suitable for molding thin two-dimensional products, it is quite obvious that they could not be employed for the production of thicker structures having long projections on one side of the matrix since leakage of the molten material would occur from the high pressure required to make such products. Thus, the major drawback encountered with the methods taught by the prior art is the inability to produce products having heavy sectioned members in the backing and thin section members extending from the backing.

Heretofore, truly three-dimensional molded products have been produced only by the batch method on a conventional injection molding machine which is time consuming and thus expensive. By "truly three-dimensional molded products" is meant products having portions such as projections that are substantially greater in dimension than the structure which interconnects and supports said portions. Conventional injection molding involves a sequence of steps that must be carried out separately. These steps include heating the mold after closing and injecting the molten material into the hot mold to permit the void areas to become filled. The mold is then chilled to solidify the molten material before separating the mold parts and removing the molded article. Therefore, it is readily apparent that a majority of the time required to carry out the batch-type method is contributed to essentials other than molding.

SUMMARY OF THE INVENTION

In accordance with the present invention a molten thermoplastic material is fed from a suitable source to an extrusion nozzle by a conventional metering pump or screw extruder. The material is forced into recessed areas in advancing associated molds under varying pressures depending upon the size and depth of the mold cavities. The material is cooled below its solidification point and stripped away from the mold in continuous lengths.

The continuous injection molding process of this invention is carried out by feeding a molten thermoplastic material to an extrusion nozzle positioned against an advancing mold surface having a multiplicity of cavities therein which are interconnected by grooves either in the advancing surface or the surface of the adjacent extrusion nozzle, applying sufficient hydraulic pressure upon the molten material to force said material into the cavities and grooves, causing the material to flow downstream in the grooves in the direction of travel of the advancing mold surface to form a network of strips which interconnect the cavities, cooling the shaped structure until solidification occurs, and then stripping the structure from the advancing surface. If preferred, the shaped structure may be compressed between opposed members before take-up.

The basic principle involved in the production of the products of the present invention encompass the application of two zones of pressures within the molding equipment for the molten material wherein a high pressure zone is isolated for the purpose of forming the thin sections or projections and a low pressure zone for forming the heavy sections or matrixes of the three-dimensional product. By employing separate pressure zones sufficient pressure can be applied to fill deep cavities having small cross-sections while simultaneously controlling the pressure in the low pressure zone to prevent leakage from the large grooves to the outside which would disrupt the operation.

Obviously several different arrangements of apparatus may be employed in the practice of this invention and particularly the means that can be used to separate the high pressure zone from the low pressure zone. For example, pressure fingers attached to the stationary extruder block or made integral therein may be dimensioned to occupy the space of longitudinally extending grooves in the advancing mold surface. These finger members serve to isolate the cavities to facilitate achievement of a high pressure therein and to prevent back flow of the molten material in the circumferential grooves where a lower pressure exists. Preferably the molten material is fed to the two pressure zones in separate streams with the high pressure extrusion ports being located well upstream of the downstream end of the pressure fingers and the low pressure extrusion ports being located over the circumferential grooves downstream from said end of these fingers. As a matter of convenience molten material to both the high pressure and low pressure extrusion ports may be supplied from a common source provided metering valves are located in the low pressure supply lines between the extruder and the low pressure extrusion ports wherein a desired pressure drop is maintained to control the amount of molten material being introduced into the grooves where the heavy section part of the product is formed. If desired the high pressure and low pressure ports may be supplied from separately metered sources by conventional pumps capable of controlling the pressures at their respective proper level.

In an alternative apparatus for introducing the molten material to the molds, a single row of extrusion ports are aligned for communication with the moving mold cavities initially to exert a high pressure as required to fill the recessed areas of the deep cavities. Upon advancement of the mold-containing cavities communication between the cavity areas and the circumferential grooves is established for an interval sufficient to fill the grooves with the molten material. During this part of the cycle the relative position of the forward end of the pressure fingers and wall of each cavity become gapped enough to meter material into the grooves under lower pressures which fill the grooves and connects the cavities together to produce a continuous product having perforations suitable for drainage. Since any wear of the pressure fingers will alter the metering characteristics of the material flowing to the grooves, this type of feeding system is not as preferable as the dual set of extrusion ports.

The above described principles are applicable to various embodiments of equipment which include a rotatable drum or a series of laterally moving plates in conjunction with a stationary extrusion member having a face area in contact therewith. This equipment may be further modified by transferring the longitudinally extending grooves from the surface of the drum or plate to the face of the extrusion member, in which instance, a product having a continuous stringer or heavy sectioned member would be formed to produce a ribbed back. Similarly, a solid backed product can be produced by employing a single groove the width of the product instead of a plurality of grooves. Also, contemplated is the use of opposed cylindrical drum surfaces wherein one surface contains cavities and the other surface has circumferential grooves, the cavities being filled from a source under a high pressure and the grooves filled from a lower-pressure source.

In carrying out the invention by utilizing a series of flat plates in place of a drum or opposed drums, extra equipment is required in order to convey the plates into and out of position with the stationary extrusion member. Conveying means are required to take the flat molds after the product is cooled and stripped on the downstream side of the polymer block, and recycle them back around to the upstream side of the block for remolding. When the plates fit properly against each other, molded product is produced in indefinite lengths by this method. For some applications, such an arrangement might be desirable. As an example if one desired to produce the mold segments by some low-cost process such as die casting where it would be desirable to make each element of the mold as small as possible, thereby using a number of these elements to form a large enough working mold to facilitate carrying out the process. Another possible advantage might arise if someone desired to vary the shape of the mold product along its length in a nonrepeating pattern. This could be accomplished by having mold segments of different configurations and sorting these mold segments according to some predetermined pattern as they were conveyed from the downstream side of the polymer block, back around to the upstream side.

All moldable thermoplastic materials may be employed with the present invention. Highly preferred materials are polyolefins such as polyethylene and polypropylene; polyvinyl halides such as polyvinyl chloride, polyvinylidene chloride, polyvinyltetrafluoride, polyvinyl chlorotrifluoride; polyvinylesters such as polyvinyl acetate; and mixtures or copolymers thereof. Other preferred materials include thermoplastic condensation polymers such as polyamides, segmented polyureaurethanes, polyurethane rubbers, silicone rubbers, natural and synthetic rubbers and polyesters. In some cases the properties of the product may be modified to improve its appearance or durability and performance through the addition of various pigments and stabilizers.

The thermoplastic material may be supplied to the extrusion nozzle by any conventional means capable of maintaining the material in a molten state and conveying the same under sufficient pressure to the mold surface. The mold surfaces, which will be described later herein, may be driven by any conventional means capable of synchronizing the speed thereof with the linear output of the thermoplastic material.

The molded objects are cooled to about 50° C. below the thermoplastic state of the material from which it is made and stripped away from the mold surface with the aid of a set of stripping fingers positioned in alignment and engaged within the longitudinal grooves. Cooling of the product is accomplished by spraying a coolant such as air or water directly onto the product itself, or the mold may be cooled by a surface coolant or passing a coolant through the inside of the drum, where applicable.

For some end products a texturing step may be desired to modify the aesthetic properties such as causing the vertically extending members to assume the random haphazardness shape of natural grass blades. The texturing step may be carried out as an in-line step upon removal of the product from the drum, or at a later time. Preferably, the texturing is accomplished by a pair of opposed rolls, converging belts, or a reciprocating plate in conjunction with a fixed member while the product is heated to a temperature at which the material may be permanently heat-set.

The principal advantages realized from this invention is the fact that indefinite lengths of the product can be made in wide widths thereby reducing the production and installation costs drastically. While the width may vary considerably it has been found that widths of at least 4 inches are preferred because of the economics involved. Also, the product should be in great lengths. Accordingly, the product contemplated by the present invention has a length at least 10 times greater than the minimum 4 inch width. Unless this minimum ratio is observed the advantages afforded by this invention cannot be realized since the economic gains will be diminished. Furthermore, for installations such as ski slopes where joints or seams may be hazardous, it is highly preferable to have the surface made from wide continuous lengths which run parallel down the slope.

BRIEF DESCRIPTION OF THE DRAWINGS

FIG. 15 is a cross-sectional view, in part of the drum and extruder head of FIG. 1 wherein the extruder head is provided with separate orifices for introducing the low pressure and high pressure material supply separately;

FIG. 16 is a fragmentary view of the drum surface in FIG. 15 illustrating how the cavities and the parallel grooves are supplied by polymer from individual sources;

FIG. 17 relates to the operation of the embodiment shown in FIG. 16 and illustrates the polymer injection positions in conjunction with the formation of the product;

FIG. 18 represents fragments of a drum and extruder head with portions of each broken away to illustrate the extrusion grooves in the face of the extruder head and the high and low pressure supply orifices;

FIG. 19 relates to the operation of the embodiment shown in FIG. 18 and illustrates the polymer injection positions in a plan view in conjunction with the formation of the product produced thereby; and FIG. 20 is a cross-sectional view of the product produced on an embodiment as shown in FIG. 18 illustrating the ribbed back which is formed in the grooves in the face of the extruder head.

With reference to FIG. 1, there is shown the general arrangement of apparatus preferred for practicing the invention wherein an extruder 10 of a well known type is provided with an extruder head 12 which is positioned in contact with a drum 14. The extruder is provided with fans 16 and resistance heaters, not shown, which are powered from an electrical source for controlling the temperature of the extruder barrel at a desired level. The extruder head 12 has a concave outer edge which fits flush against the surface of drum 14. This close contact is maintained through the linkage arms 18 and 20 which are pivoted by a pneumatically operated cylinder 22 to move the drum 14 into and out of contact with the extruder head 12. A motor 24 rotates the drum 12 at a selectively predetermined speed in the direction indicated by the arrow to advance a molten thermoplastic material deposited on the drum at the extruder head 12. A cooling medium is introduced into the drum at the inlet 26 and collected in a drip pan 28 having a drain outlet 30. The solidified material is stripped from the drum by a multi-pronged device 31 referred to herein as stripping fingers and is then taken up in a roll as shown. As an optional step in the process, the product 33 may be textured or heat-set between a pair of pressure rolls 35.

To obtain a better understanding of the more important aspects of this invention, reference is made to FIGS. 2 and 3 wherein the details of the drum surface and extrusion head are more clearly illustrated. In FIG. 2 the close fitting relationship of the extruder head 12 and drum 14 is shown in cross-section to illustrate the extrusion nozzle 32 in a communicating position with the cavity 34. The cylindrical drum is provided with a multitude of equally spaced rows of cavities 34 having inserts 36 press-fitted into these cavities to selectively limit the penetration of the polymer melt into the drum and thus control the height of the projections formed from the polymer. Preferably the inserts 36 are engraved around their circumferences to provide longitudinal recesses 38 (note FIG. 3) which produce relatively thin projections resembling grass blades.

It is to be understood however that the inserts 36 are shown merely to illustrate a preferred embodiment of this invention since obviously the inserts may be of different shapes or they may be removed from the cavities.

Figure 3:
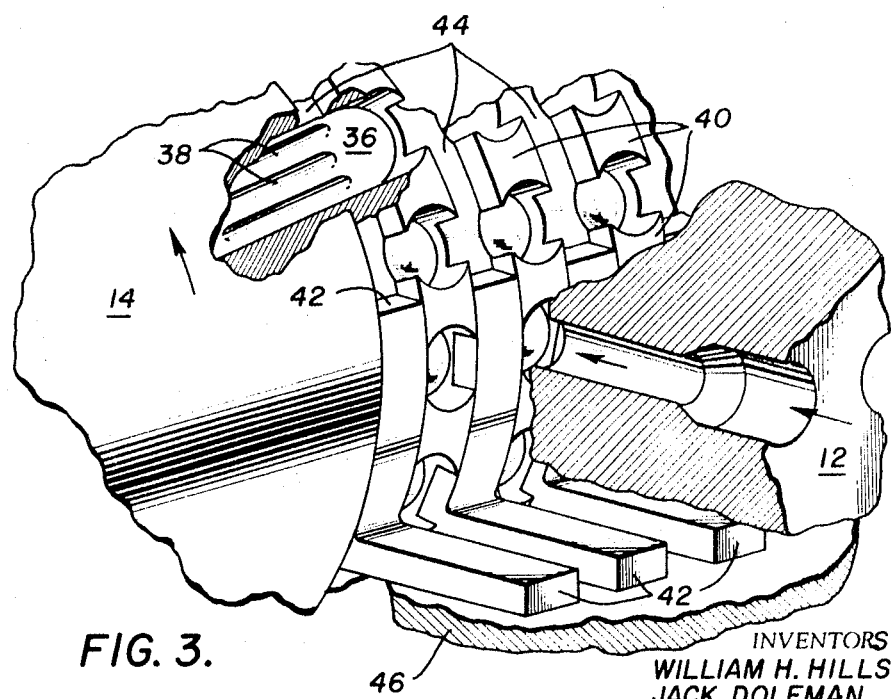
FIG. 3 is a fragmentary perspective view of the drum surface and extruder head illustrating the path of communication between said members and the three-dimensional profile of the drum surface.
Figure 4:
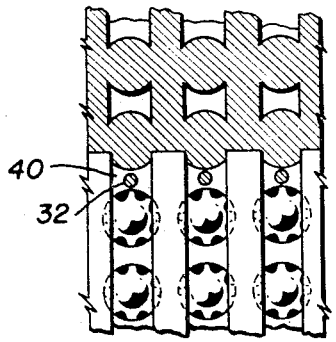
FIGS. 4–7 illustrate, in sequence, the relative positions of the drum and the extruder head through a partial revolution of the drum to further illustrate the injection cycle employed to produce the product of the present invention.
Figure 5:
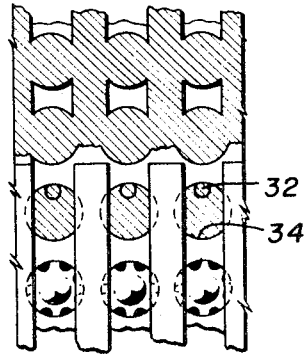

Referring to FIG. 3 the polymer supply is injected by hydraulic pressure through extruder nozzle 32 into the aligned drum cavity. In order to inject the polymer melt into the extreme depths of the longitudinal recesses 38 in the surface of the inserts 36, a seal must be maintained around the immediate area of the point of injection. This is accomplished by providing the drum surface with the raised portions 40 that effectively block the flow of the polymer supply in sequence as the drum rotates whereby perforations occur in the final product, and the use of L-shaped members 42 which fit loosely in the grooves 44 that circumscribe the cylindrical drum 14. These L-shaped members function as extruder fingers to prevent the polymer melt from flowing along the grooves which flowing would cause a reduction in the pressure essential for completely filling the cavities 34. The extruder fingers 42 are inserted in the grooves 44 and retained therein by a plate 46. Without the use of extruder fingers, or their equivalents, the polymer melt has a tendency to back flow in groove 44 to the extent that the recessed areas 38 around the inserts are not completely filled whereby an inferior product is molded. The polymer is admitted to the grooves 44 just before the communication from the extruder nozzle is sealed off by the raised portions 40 whereupon the polymer flows along said grooves only in the direction of drum rotation since the pressure fingers block any flow in the other direction. Thus, it will be recognized that with the above described arrangement it is possible to separate the supply polymer into two pressure zones in order to impose the substantial amount of pressure that is required to force a viscous thermoplastic material into confined areas having substantial depths such as about ½ inch or greater. It has not been possible to achieve this accomplishment heretofore on conventional molding equipment.

Figure 6:
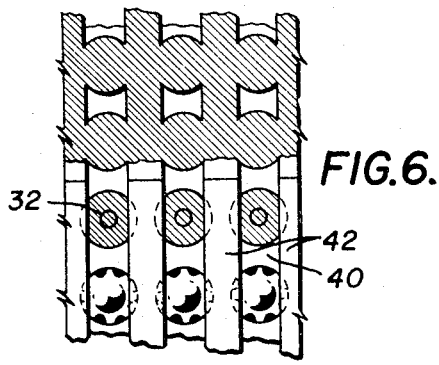
Figure 7:
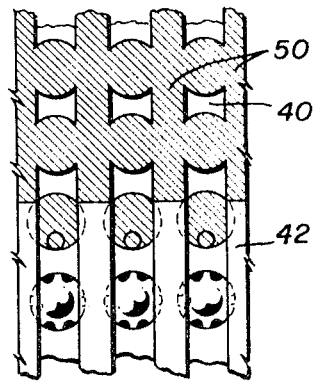

FIGS. 4 through 7 illustrate the formation of the product in a series of steps which show the relationship of the extrusion nozzle or orifices 32 and the surface of the drum 14 after the drum has been rotated an increment in each figure until the drum has progressed through a feeding cycle. Referring to the figures in order, the polymer supply 32 is shown aligned against raised portions 40 in a non-feeding position. As the drum rotates to the position shown in FIG. 5, the extrusion orifice begins communicating with cavity 34. In FIG. 6 the extrusion orifice is in direct alignment with the cavity at which position the radial flow of the material is blocked in all directions by the raised portions 40 and the extruder fingers 42. Therefore, the polymer melt is forced into the depths of the cavity to completely fill all recessed areas. Further rotation of the drum provided communication with grooves 44 between the end of extruder fingers 42 and the raised portions 40 to supply enough material to form the stringers 50 which connect the clusters of projections to produce a lattice-type construction.

Figure 8:
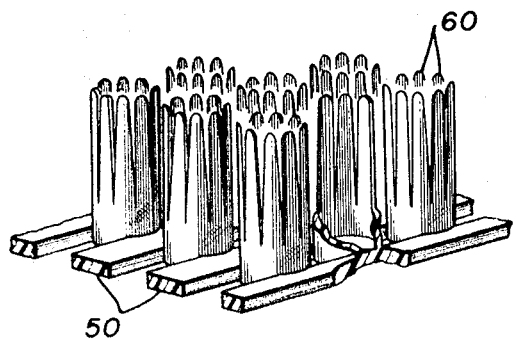
FIG. 8 is a pictorial view of the product as it is stripped from the drum and further illustrates the perforations in the base of the product in addition to the cups formed at the base of the projecting members.
Figure 9:
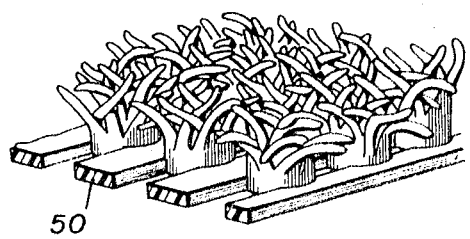
FIG. 9 is a pictorial view of the product shown in FIG. 8 after having undergone a texturing treatment which imparts a grass-like resemblance to the product.

One possible product of this invention is shown in FIGS. 8 and 9. The product of FIG. 8 is depicted in the shape it is stripped away from the drum and FIG. 9 represents the same product after it has been subjected to a texturing treatment which flattens the projections 60 to resemble grass blades. A cross-section of the cup-like base supporting the cluster of projections 60 is shown to illustrate the connection between said base and the stringers 50.

Figure 1:
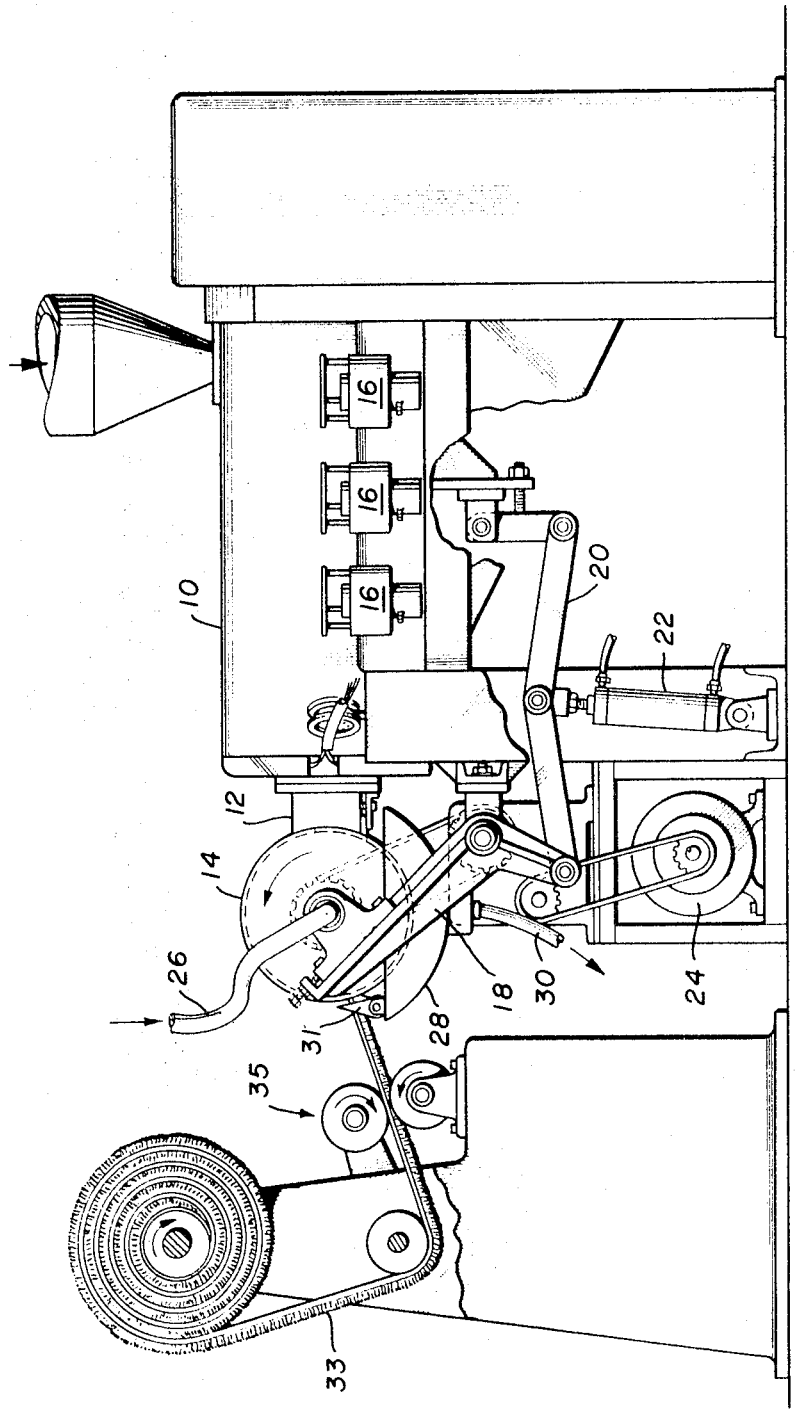
FIG. 1 is a side elevational view of the preferred embodiment of apparatus for carrying out the process of this invention.
Figure 2:
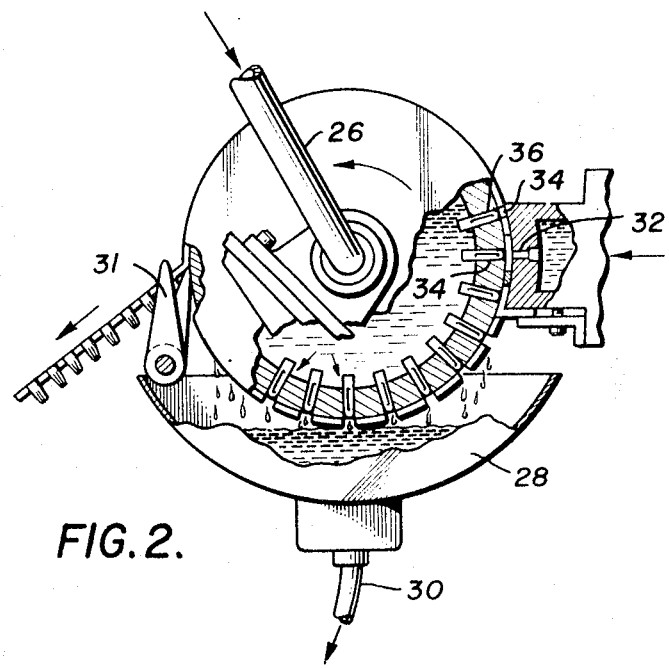
FIG. 2 is a cross-sectional view, in part, of the drum and extruder head of FIG. 1 illustrating, in detail, the construction of the drum and associated equipment.
Figure 10:
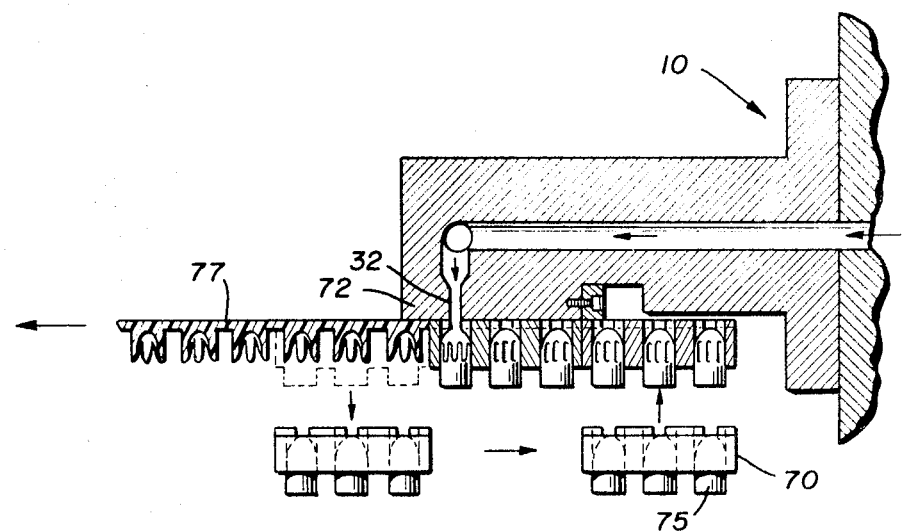
FIG. 10 represents an alternative embodiment of apparatus, shown in cross-section, which may be employed to practice this invention whereby a number of flat-plate dies are employed rather than a cylindrical drum.
Figure 11:
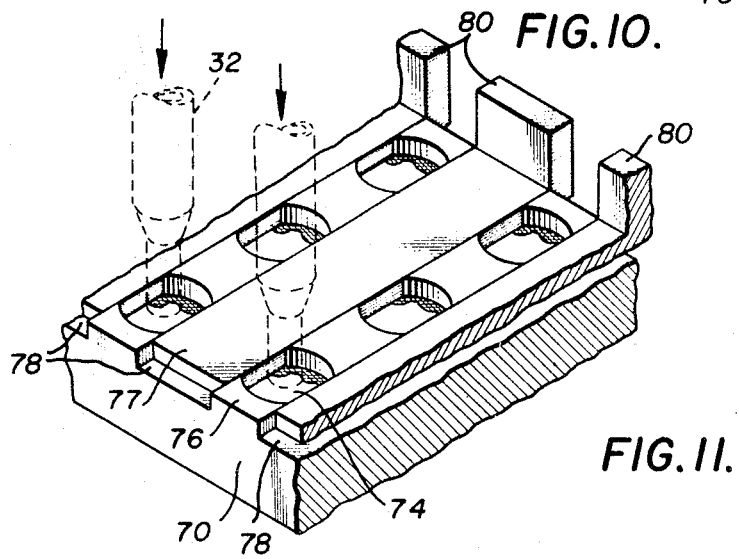
FIG. 11 is a perspective view of the die plate used in the arrangement shown in FIG. 10 which illustrates the details of the mold surface.

Another embodiment of apparatus which may be employed for carrying out the invention is shown in FIG. 10 wherein the overall arrangement of apparatus is similar to that illustrated in FIG. 1 except that plates are employed instead of a drum and the extruder head is adapted to accommodate the plates. In the cross-section of the elevational view shown, a continuous mold surface is produced from a number of plates 70 which are abutted to form a linear path while in contact with the extruder head 72. The plates are advanced through the feeding cycle and returned to the starting position along the path indicated by the line of arrows by a conventional conveyor system, now shown. The principles involved in the production of the three-dimensional products disclosed herein are the same as those discussed in connection with the cylindrical drum. For example, as shown in FIG. 11, the plate 70 is provided with cavities 74 which are separated by protruding plate portions 76. The plate is also provided with parallel grooves 78 to accommodate the extruder fingers 80 for the same purpose as earlier explained. The extruder fingers are secured against a shoulder forming a part of a cut away portion of the extruder head. With the extruder fingers and polymer supply being stationary there is communication between the polymer supply and the grooves during part of the injection cycle after the cavities have been filled, as was illustrated in FIGS. 4 through 7. The communication occurs between the end of the extruder fingers 80 and an adjacent plate portion 76.

Referring to FIG. 10 and the details illustrated, there is shown a portion of the extruder 10 having the modified extruder head 72 mounted thereto and the plates 70 which are positioned for advancement with their mold surfaces in contact with the face of the extruder head. The cavities 74 are provided with press-fitted inserts 75 which block the flow of polymer through the plate 70. The end of the inserts exposed to the extrusion nozzle 32 have grooves spaced around their circumferences to provide elongated recesses for receiving the polymer melt when the cavity passes in alignment with the extrusion nozzle 32. The plate 70 is advanced along its lineal path until the molten polymer becomes solidified and then the plate is removed leaving the molded product 77 which may be advanced through a texturing step prior to take-up or may be advanced directly to a take-up roll. The removed plate is returned to a starting position along the path indicated by arrows by the conventional conveyor, not shown, where it abuts another plate already advancing along a lineal path toward the extrusion nozzle thereby providing a continuous lineal molding surface.

Figure 12:
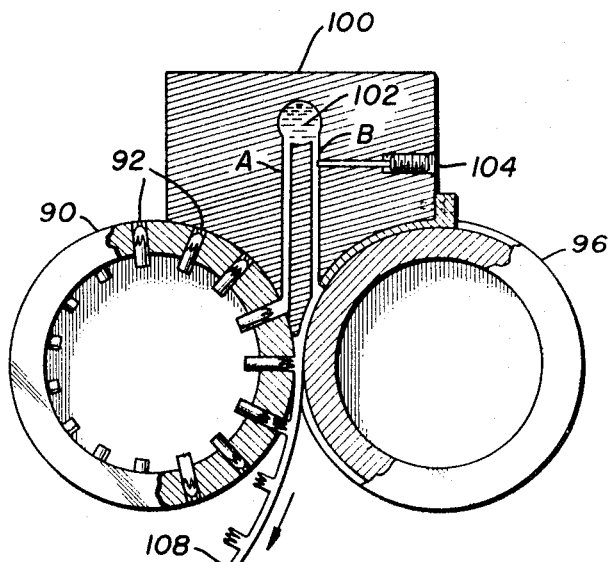
FIG. 12 is a cross-section of opposed rotatable drums wherein one drum surface is provided with rows of cavities interconnected by grooves and the other drum surface is provided with parallel grooves circumscribing the cylindrical surface thereof.
Figures 13, 14:
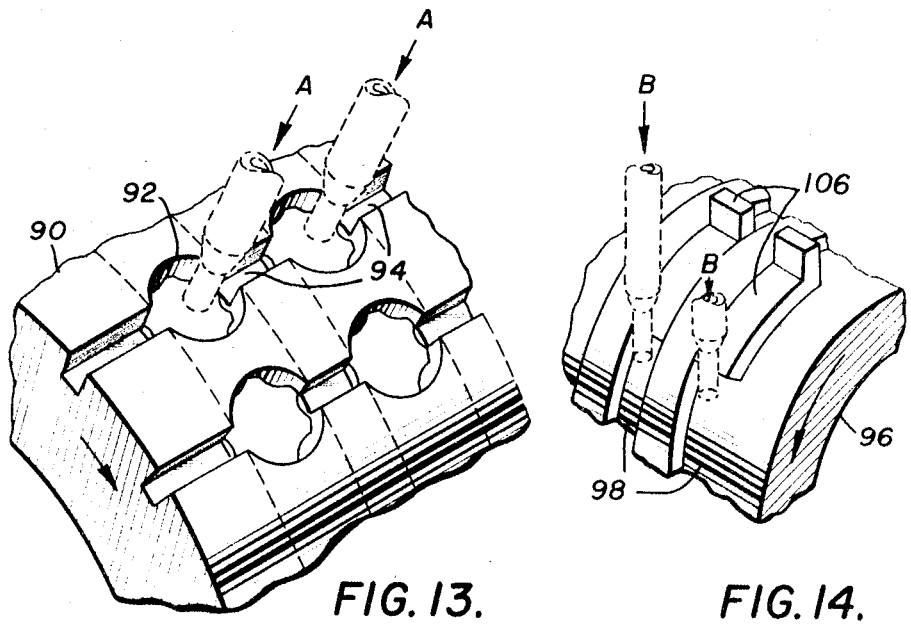
FIG. 13 is a fragmentary view of the drum in FIG. 12 having the interconnected cavities illustrating the surface design.
FIG. 14 is a fragmentary view of the other drum in FIG. 12 which has parallel grooves around the surface thereof illustrating the polymer supply and extruder fingers.

Another embodiment of apparatus useful for practicing the invention is shown in FIGS. 12 and 15 wherein opposed drums are employed to make the molded product described herein. Referring initially to FIG. 12, there is shown a cylindrical drum 90 having cavities 92 selectively spaced around the peripheral surface thereof. As illustrated in FIG. 13, which depicts a portion of the surface of drum 90, the cavities are connected with interconnecting grooves 94. An opposed drum 96 rotates in contact with drum 90. A fragment of the surface of drum 96 is shown in FIG. 14 which illustrates a number of parallel grooves 98 circumscribing the drum. An extruder head 100 having a polymer source 102 is modified to accommodate partial circumferences of drums 90 and 96 whereby the extruder head is in contact with each of the drums. The polymer supply is divided into a polymer stream A which is injected into the cavities 92 and a polymer stream B which is discharged into the parallel grooves 98 forward of the extruder fingers 106 as shown in FIG. 14. A metering valve 104 is provided to control the pressure of polymer station B at a lower level than stream A. The finished product 108 is solidified and removed from drum 90 in accordance with previously stated procedures.

It will be noted that in the apparatus described hereinbefore, the extrusion orifices are positioned axially across the extruder head in a single row to communicate directly with the mold cavities upon movement of the mold surface. As illustrated in FIGS. 4 through 7, the stringer grooves are filled by polymer flowing from the high pressure zone into the grooves through a gap between the pressure fingers and a raised portion on the mold surface that separate long enough to supply a low pressure flow of material. The gap functions as a metering valve to reduce the pressure and prevent overfilling. A preferred modification to this type of feeding system is shown in FIG. 15 which illustrates the molten material from passageway C in direct communication with the drum cavity 110. Similarly, the stringer grooves 112 (note FIG. 16) are supplied with molten material flowing through passageway D which is provided with an adjustable metering valve 114. The dual set of molten material supply sources is more clearly illustrated in FIG. 16. This type of feeding system makes it possible to supply a molten polymer from a common source to the mold cavities under pressures high enough to facilitate injection of the polymer into deep, small recesses and to the grooves under substantially lower pressures. Thus, in order to accurately control the system in a particular situation, the pressure of the common supply source is controlled to accomplish the injection into the cavities and the metering valve is adjustable for controlling the pressure as necessary in the low pressure zone. Further illustration of this type of dual pressure zone system is shown in FIG. 17, including the formation of the product 116.

FIG. 18 represents another embodiment of apparatus that may be employed to carry forth the present invention. In this embodiment, the grooves 120 are cut in the face of the stationary extruder head 122 instead of the mold surface. Again the double row of orifices is shown to illustrate how the molten material is supplied to the mold area between extruder head 122 and the rotatable drum 124 which is shown as a broken-away fragment to better illustrate the position of the orfices. Material E is injected into the recesses 125 engraved around the circumference of pin 126 to form a cluster 128 of thin projections connected in a circle to a cup-like portion 130 which is formed around the dome of pin 126. The clusters are integrally connected to the stringers or heavy sectioned portions 132 which are formed in the grooves 120. These details of the process and product are clearly illustrated in FIGS. 19 and 20. Obviously, the depth and width of the grooves may be varied to change the shape and size of the stringers 132 as desired even to the extent of using a single depth cut away which would produce a product having a solid back. In all of these instances the pressure to the grooves can be controlled by the adjustable metering screws 134.

Figure 21:
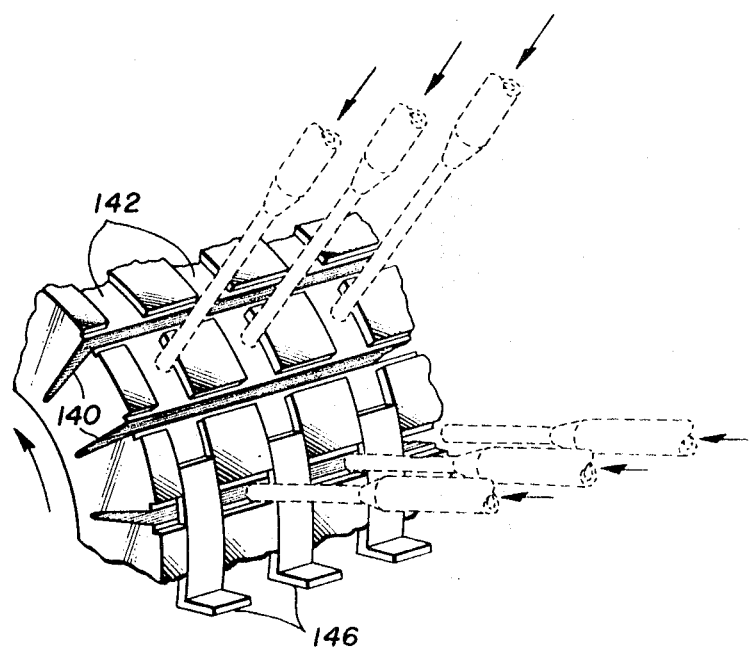
FIG. 21 is a fragmentary portion of a drum illustrating wedge-shaped grooves extending across the drum in place of the rows of cavities.
Figure 22:
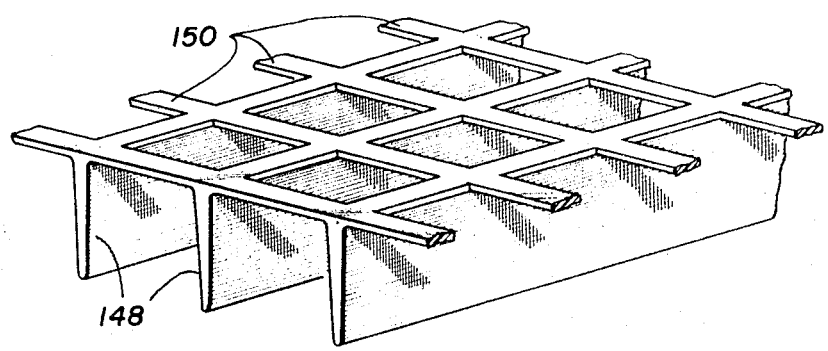
FIG. 22 represents the product made from the type embodiment shown in FIG. 21.

A further embodiment of the invention is illustrated in FIG. 21 wherein a fragment of a drum surface as employed in the previous embodiments is shown to illustrate a different surface design which facilitates the production of the product shown in FIG. 22. Referring to FIG. 21 it will be noted that the surface of the drum is provided with wedge-shaped grooves 140 extending across the width of the drum which are interconnected by parallel grooves 142 around the circumference of the drum. As in FIG. 16, a dual two-stage pressure feed system is employed to convey molten material to the deep grooves 140 at a higher pressure and to grooves 142 at a lower controlled pressure in accordance with procedures described earlier herein. The pressure fingers 146 function to isolate the flow between the channels so that the material will reach the extreme depth of the groove.

With reference to FIG. 22 which represents the product obtained from the drum design of FIG. 21, it will be noticed that the wedge-shaped grooves form thin, inverted wedge-shaped projections 148 that are connected together by the widely spaced apart stringers 150 which are formed in the parallel grooves 142. The stringers 150 have extremely small thicknesses when compared to the height of the sharp-edge projections 148. A product of this type can be employed on newly excavated banks and the like to prevent soil erosion. The projections will counter the tendency of the soil to wash until grass will grow through the open back.

PREFERRED EMBODIMENTS

The following examples are given to show the preferred products and process conditions of applicant's invention which are merely illustrative of the wide variety to products that may be obtained when following the teachings of the invention set forth.

Example 1

This sample illustrates a preferred method of producing a continuous pigmented polyolefin structure which after compacting is suitable for use as an artificial turf.

Apparatus used in accordance with that illustrated in FIGS. 1, 15 and 16 as previously described.

Polyethylene pellets were melted and fed under hydraulic pressure from a 4½" screw extruder into the special distributing nozzle previously described. Two rows of holes in the nozzle directed polymer into the cavities and grooves of a mold drum. The first row of holes to contact the empty mold drum supplied polymer to the deep tuft cavities, the second row of holes supplied polymer to the stringer-grooves. Stationary fingers lying in the grooves of the mold drum isolated each tuft cavity while molding took place, thus creating a zone of high pressure which allowed full depth penetration of the narrow selected deep cavities. The aforementioned fingers terminated just upstream of the row of holes supplying polymer to the stringer-grooves. Polymer was deposited in the stringer-grooves at a pressure slightly above atmospheric regulated by flow restrictors to control the amount of polymer fed to each groove. By adjusting the resistrictors it was possible to obtain a balance of molding pressures to completely fill the tuft cavities and product stringers flush with the surface of the mold drum. Sufficient cooling water was fed to the inside of the drum and allowed to escape down the tuft cavities to maintain the chilling capacity of the drum.

Using a blend of 100 parts polyethylene (Monsanto MPE 87) Melt Index 22 and 4 parts green pigmented polyethylene (90% PE, 10% Pigment), a continuous run of over 2 hours duration was made during which the following process conditions were observed and maintained. Melt temperature measured at extruder exit, 425° F.; temperature of nozzle, 350° F.; temperature of mold drum surface, 125° F.; pressure at end of extruder barrel, 1350 p.s.i.; molding pressure (Tufts), 1100 p.s.i.; molding pressure (stringers), 50 p.s.i., total force holding mold drum in contact with nozzle, 9000 lbs.; peripheral speed of drum, 4 f.p.m.; cooling time before stripping product from drum, 30 seconds; cooling water to drum at 70° F., 2½ gals./min.

The shape of the finished product can best be described with reference to the shape and configuration of the mold drum. The steel drum used had an outside diameter of sixteen inches with a wall thickness of 1⅛" and was fabricated to produce a continuous product of 6" overall width in the following manner: 16 circumferential grooves 3/16" wide by 1/16" deep spaced at .400" centers were turned into the outside face of the drum to form continuous stringers. Equally spaced between the grooves at 3° intervals axial rows of fifteen 9/32" diameter holes were drilled through the wall of the drum. These holes intersected the grooves, thus ensuring lateral continuity to the product. Press fitted into each hole was a brass tuft insert 2" long of substantially cylindrical form with eight equally spaced flutes cut on the outside diameter with a 1/16" radius cutter to a maximum depth of .040", tapering away from the axis of the insert, at 1¼° to a length of 1" from the end nearest the surface of the mold drum. To assist flow of the polymer down the length of the flutes, the outer end of the insert was made hemispherical and set 1/16" below the outer surface of the mold drum. The finished product completely filled the mold drum to produce a product as shown in FIG. 8 having 1 inch tufts on projections. The remaniing outer surface of the mold drum which maintained sliding contact with the distributing nozzle produced holes in the back of the product which in the case of artificial turf serve as drain holes. After compacting and heat settling to form a product as shown in FIG. 9, the material was collected on a mandrel in the form of a continuous strip of artificial turf.

Example 2

This example illustrates an artificial grass product that can be made following the teaching of the prior art wherein no provision is made to maintain differential pressures within the mold.

Apparatus was used identical to Example 1, except only one set of polymer ports was provided, the set feeding the tufts. No pressure fingers were provided. Mold shape and temperatures as well as cooling water conditions were the same as Example 1. When polymer pressure was 500 p.s.i. at the end of the extruder, and 250 p.s.i. at the discharge end of the metering parts, a product was produced having tufts 5/16" high above the stringers, and no leakage occurred from the stringer grooves upstream of the polymer block. When polymer flow to the mold was increased, severe leakage occurred along the stringer groove to the upstream side of the polymer block, even though the extruder pressure remained below 550 p.s.i. The tufts thus produced were still only 5/16" high.

Example 3

This example illustrates a method used to produce a continuous molded structure suitable for use as an artificial ski slope.

Apparatus used in accordance with FIGS. 1 and 15.

Polypropylene pellets are melted and fed under hydraulic pressure from a screw extruder to a special distributing nozzle previously described having two rows of polymer supply holes. The first row of holes directing polymer into the deep tapered cylindrical cavities and lateral grooves in the mold drum. The second row directing polymer to recesses in the special nozzle from which polymer is extruded as stringers onto the outer surface of the mold drum. Restrictors are employed to control the amount of polymer supplied to each stringer.

Typical conditions for this process are as follows: melt temperature at extruder exit, 500° F.; nozzle temperature, 400° F.; temperature of the mold drum surface, 150° F.; pressure at end of extruder barrel, 1500 p.s.i.; molding pressure (cavities), 1250 p.s.i., molding pressure (stringers), 50 p.s.i.; total force holding drum in contact with nozzle, 10,000 lbs.; peripheral speed of drum, 4 f.p.m.; cooling time before stripping, 30 seconds.

The final product takes the form of a series of cylindrical projections 3/16" diameter at root with a concave tapered outer surface reducing this diameter to 1/16" over a length of 1¼". These members spaced on ¼" centers widthwise and lengthwise, are connected laterally by a filler piece ⅛" wide by 1/16" deep, and longitudinally by overlaid stringers ⅛" wide by 1/16" deep.

Example 4

This example illustrates a method one would use to produce a continuous molded structure suitable for use as an artificial soil retention media on slopes or gradients.

Apparatus used and process conditions are in accordance with Example 1, except that tuft cavities would be replaced by a T section slot the full width of the product as shown in FIG. 21. The cross section of the T on the outer surface of the drum being 3/16" wide and 1/16" deep and the leg of the T being ⅛" thick at the root, tapering to 1/16" thick at an overall depth of one inch. Spacing of stringers and T's would be on approximately 2" centers.

It would be apparent from the foregoing disclosure by those skilled in the art that several modifications may be made to the apparatus for carrying out the processes for producing the variety of products as taught by this invention. Accordingly, there is no intention of limiting the scope of the invention in any way except as those limitations set forth in the appended claims.

What is claimed is:

1. A method for producing continuous lengths of three-dimensional molded products by an injection molding process which comprises:
   (a) feeding a molten thermoplastic material to the face of an extrusion nozzle positioned against an advancing mold surface having a multiplicity of cavities therein and a multiplicity of continuous grooves located between and interconnecting with said cavities,
   (b) applying sufficient hydraulic pressure upon the molten material in a high pressure zone to force the material into the extremities of said cavities,
   (c) feeding the material at a lower pressure into the grooves, located between and interconnecting with the cavities, such that it flows in the direction of travel of the mold surface to form a matrix which interconnects with the cavities whereby a three-dimensioned product comprised of a matrix having projections extending therefrom is formed,
   (d) cooling the product until solidification is completed, and
   (e) removing the solidified structure from the mold surface.

2. The method of claim 1 in which the molten material at said lower pressure is caused to flow along channels which are interconnected with the cavities to effect a fusing together of the material in said channels with the material in said cavities.

3. The method of claim 1 in which the molten material is introduced to the mold surface through a single row of orifices spaced apart transversely across the mold surface.

4. The method of claim 3 in which a substantially lower pressure zone is established in the interconnected channels by selectively isolating flow from the cavities into the channels except for intermittant short intervals.

5. The method of claim 4 in which the cavities are isolated in part by members positioned in said channels.

6. The method of claim 1 in which the pressure in the high pressure zone exceeds 500 p.s.i.g.

7. The method of claim 1 which further includes texturing the product by applying pressure to the top of the projections to reorient the direction of the projections from the matrix.

8. The method of claim 1 in which the product is cooled to approximately 50° C. below the thermoplastic state of the material before removal from the mold.

9. The method of claim 1 in which the mold surface is a cylindrical drum.

10. The method of claim 1 in which the mold surface is comprised of a series of abutting plates.

11. A method for producing continuous lengths of three-dimensional products composed of projections extending from at least one surface of a matrix from a molten thermoplastic material by shaping the material between two associated members that form a mold having a multiplicity of deep cavities interconnected by grooves located between the cavities and which have a lesser depth than said cavities which comprises:
   (a) introducing molten material into the mold from a pressurized supply source,
   (b) feeding the molten material into the interconnected cavities and grooves,
   (c) selectively controlling the flow into the grooves at a pressure substantially lower than the pressure in the cavities,
   (d) advancing at least one of the members with respect to the other causing communication between the supply source and the mold to form continuous lengths of the material, and
   (e) cooling the material before removing it from the advancing member.

12. The method of claim 11 in which the molten material is introduced into the mold in separate sources from the pressurized supply source.

13. The method of claim 12 in which one of said separate sources is controlled at a substantially reduced pressure.

14. The method of claim 13 in which the reduced pressure source communicates with the grooves and the other separate source communicates with the cavities.

15. The method of claim 14 in which the pressurized supply source is maintained above about 500 p.s.i.g.

16. The method of claim 11 in which the removed material is textured by applying pressure to the top of the projections to reorient the direction of the extending projection in a randomly haphazard manner.

17. The method of claim 11 in which the material is selected from the group consisting of polyethylene, polypropylene, polyamides and polyesters.

18. The method of claim 17 in which the molded material is cooled to approximately 50° C. below the thermoplastic state of the material before removal from the advancing member.

References Cited

UNITED STATES PATENTS

| 2,327,627 | 8/1943 | Esselen | 264—216 |
| 3,085,292 | 4/1963 | Kindseth | 264—167 |
| 3,196,196 | 7/1965 | Burbank | 264—167 |
| 3,445,915 | 5/1969 | Cuckson et al. | 264—174 |

ROBERT F. WHITE, Primary Examiner

G. AUVILLE, Assistant Examiner

U.S. Cl. X.R.

264—216, 329